US012052225B2

(12) United States Patent
Bull et al.

(10) Patent No.: US 12,052,225 B2
(45) Date of Patent: Jul. 30, 2024

(54) ATTRIBUTION OF USER DATA SOURCES ACROSS DATASETS IN A DATA SHARING PLATFORM

(71) Applicant: Cisco Technology, Inc., San Jose, CA (US)

(72) Inventors: Oliver James Bull, Bristol (GB); Trevor George Smith, Leatherhead (GB); Gaétan Feige, L'Hay les Roses (FR); Arvind Tiwari, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 392 days.

(21) Appl. No.: 17/476,990

(22) Filed: Sep. 16, 2021

(65) Prior Publication Data
US 2023/0081545 A1 Mar. 16, 2023

(51) Int. Cl.
*H04L 9/40* (2022.01)
*H04L 41/22* (2022.01)

(52) U.S. Cl.
CPC .......... *H04L 63/0414* (2013.01); *H04L 41/22* (2013.01); *H04L 63/102* (2013.01); *H04L 63/105* (2013.01); *H04L 63/108* (2013.01)

(58) Field of Classification Search
CPC .......................... H04L 63/0414; H04L 63/102
See application file for complete search history.

(56) References Cited

U.S. PATENT DOCUMENTS

| 10,601,956 | B2 | 3/2020 | Nucci et al. | |
|---|---|---|---|---|
| 2002/0143930 | A1* | 10/2002 | Babu | G08G 1/20 709/224 |
| 2004/0177002 | A1* | 9/2004 | Abelow | G06Q 10/0639 705/14.19 |
| 2009/0300723 | A1* | 12/2009 | Nemoy | H04L 63/102 726/4 |
| 2017/0032016 | A1 | 2/2017 | Zinner et al. | |
| 2018/0089269 | A1 | 3/2018 | Pal et al. | |
| 2019/0026322 | A1 | 1/2019 | Gerweck et al. | |
| 2019/0319932 | A1* | 10/2019 | Kandregula | H04L 67/306 |
| 2020/0125530 | A1 | 4/2020 | Barth et al. | |
| 2020/0151281 | A1 | 5/2020 | Paulsen et al. | |
| 2021/0182915 | A1* | 6/2021 | Blaikie, III | G06Q 20/145 |
| 2021/0342472 | A1* | 11/2021 | Forman | G06F 21/31 |
| 2022/0050855 | A1* | 2/2022 | Chu | G06Q 30/0617 |

\* cited by examiner

*Primary Examiner* — William S Powers
(74) *Attorney, Agent, or Firm* — BEHMKE INNOVATION GROUP LLC; James M. Behmke; James J. Wong

(57) ABSTRACT

In one embodiment, a data sharing platform performs a series of data operations to provide different types of data via different sharing services of the data sharing platform that are derived from data shared by a particular data owner. The data sharing platform generates tag data associated with the particular data owner for one or more of the series of data operations. The data sharing platform determines, based on the tag data, an attribution chain that links the data shared by the particular data owner to the different types of data provided via the different sharing services. The data sharing platform sends an indication of the attribution chain for display.

20 Claims, 7 Drawing Sheets

ATTRIBUTION OF USER DATA SOURCES ACROSS DATASETS IN A DATA SHARING PLATFORM

TECHNICAL FIELD

The present disclosure relates generally to a data sharing platform, and, more particularly, to the attribution of user data sources across datasets in a data sharing platform.

BACKGROUND

As the Internet continues to mature, more and more data is being produced by users and their devices. Often, this data is collected and used in exchange for the ability to access a particular service. For instance, a user may consent to sharing their personal information in exchange for the ability to access a social media service. In another example, a user may consent to their emails being scanned for keywords, in exchange for the ability to use an email service.

A fundamental shift in the traditional model for data sharing now puts the user in control of how and when their data is shared. Indeed, the General Data Protection Regulation (GDPR) in the European Union, as well as similar laws and regulations elsewhere, now affords users of online services greater control over their own data. However, even in systems that allow a user to opt into sharing their data, there is no mechanism to track and attribute the use of that data back to the user. This is particularly true in cases in which the data shared by the user undergoes a number of transformations before being sent to a data consumer (e.g., an average thermostat setting for a particular zip code, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
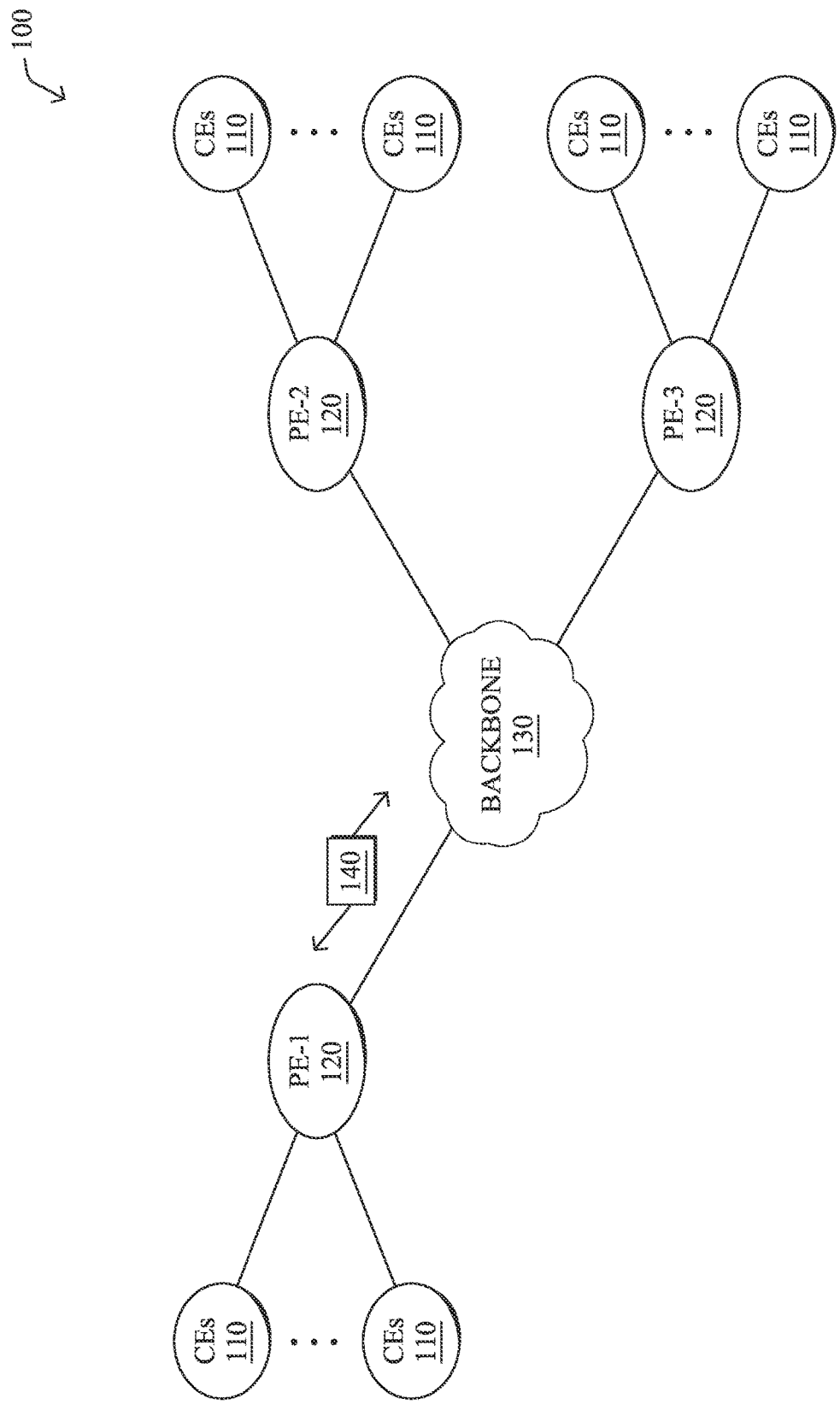
FIGS. 1A-1B illustrate an example communication network.

According to one or more embodiments of the disclosure, a data sharing platform performs a series of data operations to provide different types of data via different sharing services of the data sharing platform that are derived from data shared by a particular data owner. The data sharing platform generates tag data associated with the particular data owner for one or more of the series of data operations. The data sharing platform determines, based on the tag data, an attribution chain that links the data shared by the particular data owner to the different types of data provided via the different sharing services. The data sharing platform sends an indication of the attribution chain for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
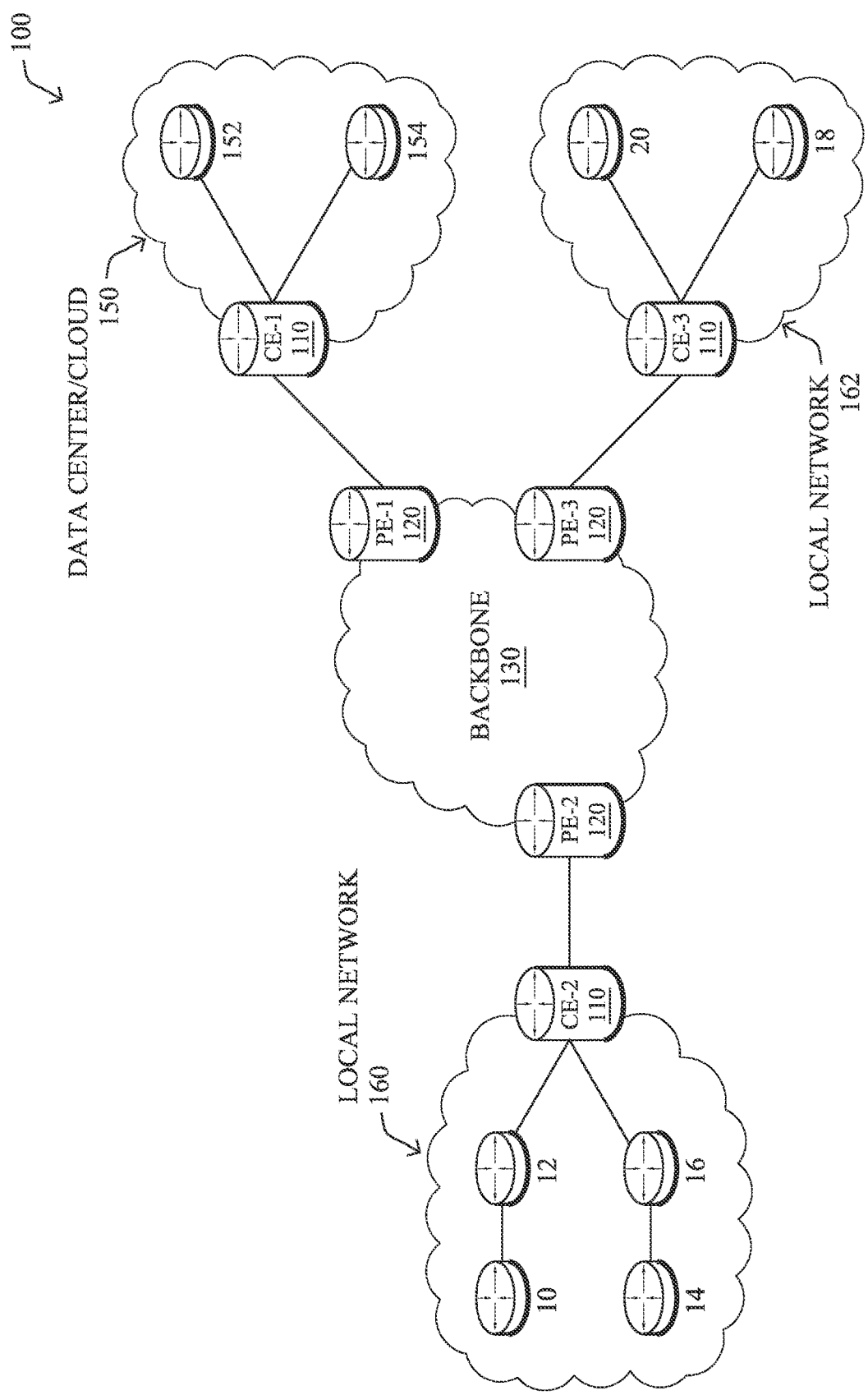

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
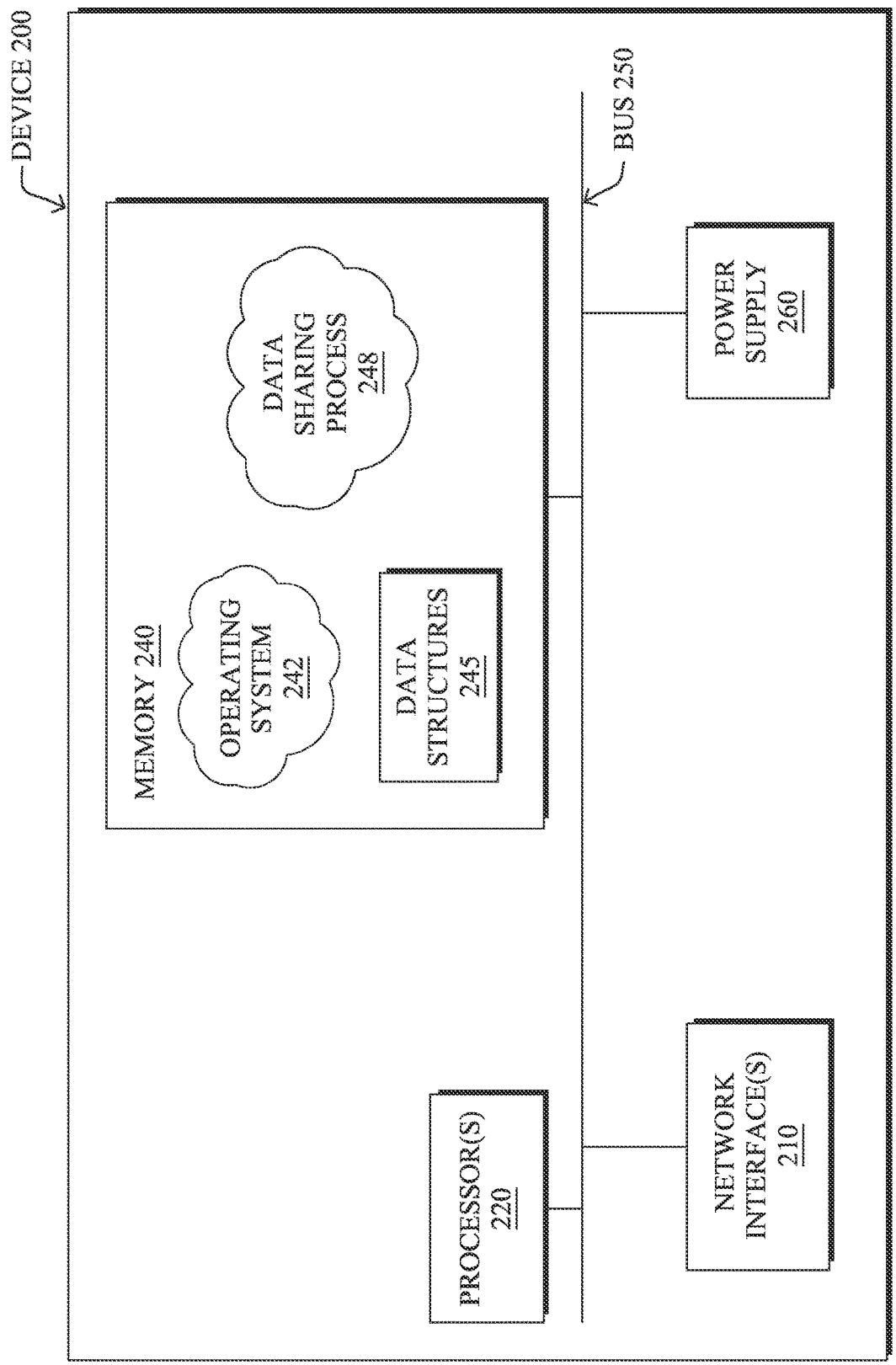
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data sharing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, as the Internet continues to mature, more and more data is being produced by users and their devices. Often, this data is collected and used in exchange for the ability to access a particular service. For instance, a user may consent to sharing their personal information in exchange for the ability to access a social media service. In another example, a user may consent to their emails being scanned for keywords, in exchange for the ability to use an email service.

A fundamental shift in the traditional model for data sharing now puts the user in control of how and when their data is shared. Indeed, the General Data Protection Regulation (GDPR) in the European Union, as well as similar laws and regulations elsewhere, now affords users of online services greater control over their own data. To date, however, their data is still 'valued' equally with that of other users of the same service, as each user is simply granted access to that service in exchange for their data. This is not always the case, though, as certain types of data may be more useful/important to the service than others.

According to various embodiments, another potential approach to data sharing consists of using a data sharing platform through which a user can share their data with any number of different data consumers, as opposed to simply a singular service that they wish to access. This presents new opportunities, such as affording a user access to one particular service, in exchange for sharing their data with one or more other data consumers. To facilitate this, however, there needs to be a mechanism in place to construct an attribution trail that connects the data shared by a data owner with the to the data actually shared by the platform. Indeed, the data shared by a data owner may undergo any number of data operations (e.g., transforming their data into an aggregated value, etc.). In addition, different portions of their data may be used by different sharing services of the data sharing platform and potentially at different times, as well.

—Attribution of User Data Sources Across Datasets in a Data Sharing Platform—

The techniques introduced herein allow for attributing use of data by a data sharing platform back to an owner of that data. In some aspects, an attribution chain may be generated that tracks use of the data owner's data as it undergoes a series of data operations performed by the data sharing platform. In further aspects, this attribution chain can be used for purposes of reporting, determining the importance of the data associated with the data owner, or for other purposes.

Illustratively, the techniques described herein may be performed by hardware, software, and/or firmware, such as in accordance with data sharing process 248, which may include computer executable instructions executed by the processor 220 (or independent processor of interfaces 210) to perform functions relating to the techniques described herein.

Specifically, according to various embodiments, a data sharing platform performs a series of data operations to provide different types of data via different sharing services of the data sharing platform that are derived from data shared by a particular data owner. The data sharing platform generates tag data associated with the particular data owner for one or more of the series of data operations. The data sharing platform determines, based on the tag data, an attribution chain that links the data shared by the particular data owner to the different types of data provided via the different sharing services. The data sharing platform sends an indication of the attribution chain for display.

Figure 3:
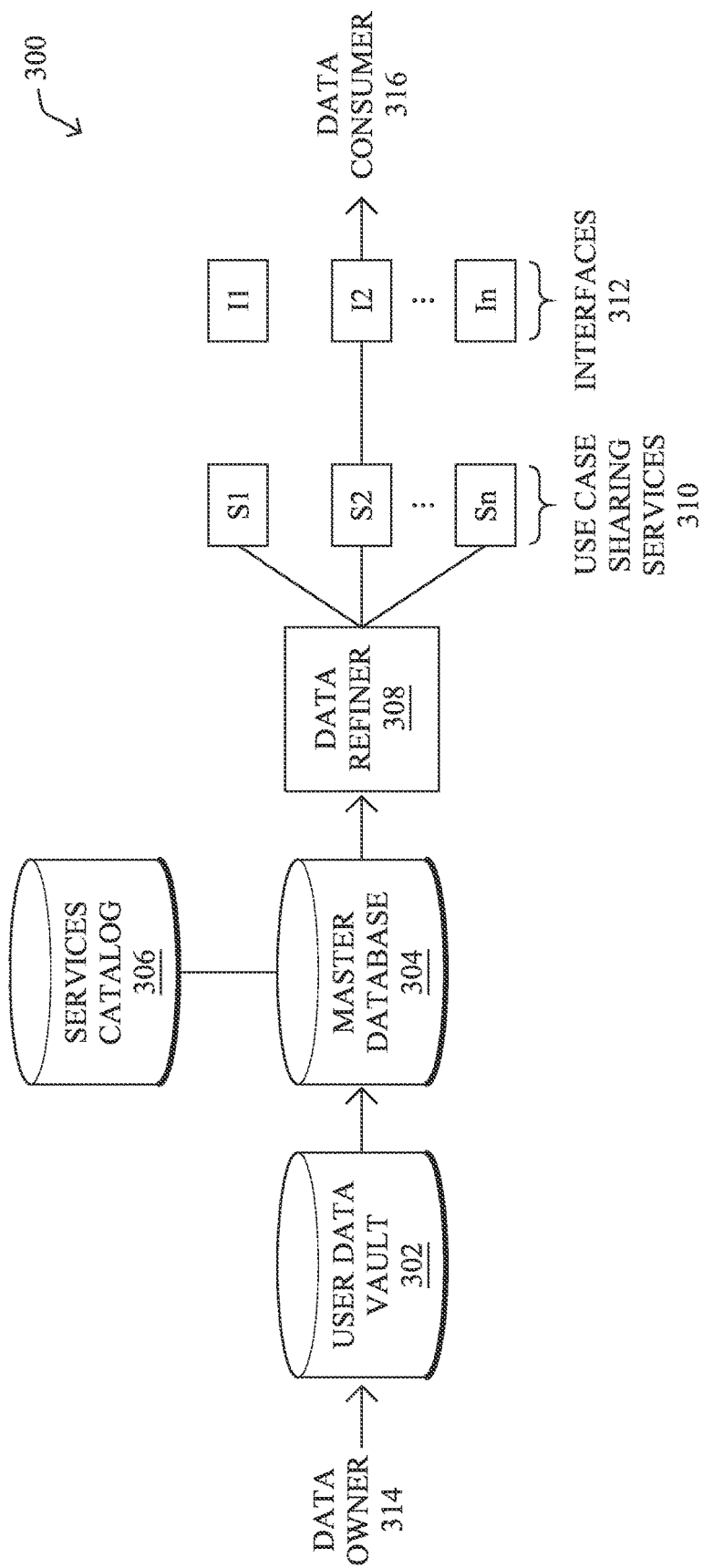
FIG. 3 illustrates an example architecture for a data sharing platform.

Operationally, FIG. 3 illustrates an example architecture for a data sharing platform 300, according to various embodiments. As shown, data sharing platform 300 may be implemented through the execution of data sharing process 248 by one or more devices, such as device 200. In many instances, data sharing platform 300 may be implemented in a distributed manner and/or as a cloud-based service. In these cases, the executing servers/devices may be viewed as a singular device for purposes of implementing data sharing platform 300.

In various embodiments, data sharing platform 300 may include any or all of the following components: a user data vault 302, a master database 304, a service catalog 306, a data refiner 308, any number of use case sharing services 310, and/or a set of interfaces 312 that provide access to use case sharing services 310. As would be appreciated, the functionalities of these components may be combined or omitted, as desired.

During operation, data sharing platform 300 may include any or all of the following system features:

A user, such as data owner 314, holds/owns their data, which is stored by data sharing platform 300 in a user data vault 302. In other words, ownership of their data is never relinquished in data sharing platform 300, allowing the user to control how and where their data is used. In further instances, data owner 314 may be an organization or other entity (e.g., a company, school, hospital, government entity, etc.).

All data stored in user data vault 302 is considered private.

Data owner 314 may selectively and permissively expose/discloses their data to master database 304 of data sharing platform 300 from user data vault 302. Generally, master database 304 stores all the disclosed data and any derived data used by any use case sharing service 310, as detailed below.

Data sharing platform 300 then uses the data in master database 304 in a variety of ways, to provide a variety of use case sharing services 310 towards third-party data consumers, such as a data consumer 316. Typically, each use case sharing service 310 may share a different type or form of data than the other use case sharing services of data sharing platform 300. To access the data of any given use case sharing services 310, data consumer 316 may interact with an application programming interface (API) of data sharing platform 300 or other interface 312 for their desired use case sharing service 310.

Any data shared via a use case sharing service 310 may undergo any number of data operations by data sharing platform 300, prior to being provided to data consumer 316. For instance, as shown, data stored in master database 304 may be processed by data refiner data refiner 308, to refine that data for export to data consumer 316. Accordingly, in many cases, the raw data supplied by data owner 314 may not be the actual data provided by any given use case sharing services 310, but may be transformed in any number of ways. For instance, consider the case in which data owner 314 shares their thermostat setting. In such a case, the actual data provided by a particular use case sharing services 310 may be an aggregate thermostat setting for a geographic area that is based in part on that shared data.

Service catalog 306 may record the various types of data available via use case sharing services 310 and be searchable by a data consumer 316.

In various embodiments, data owner 314 may opt into or out of sharing any portion of their data with master database 304 over the course of time. In some embodiments, data sharing platform 300 may also compute the importance of their shared data, thereby allowing data owner 314 to make a more informed decision. For instance, an importance metric for the data shared by data owner 314 with master database 304 may be based on the popularity of the sharing service(s) 310 that rely on that data, how much of a contribution the data had on the final data shared by those services or how unique it is, etc. Such an importance metric may also be used, in some instances, to compensate data owner 314, such as by granting data owner 314 access to certain services, resources, data, etc., in exchange for sharing their data.

Figure 4:
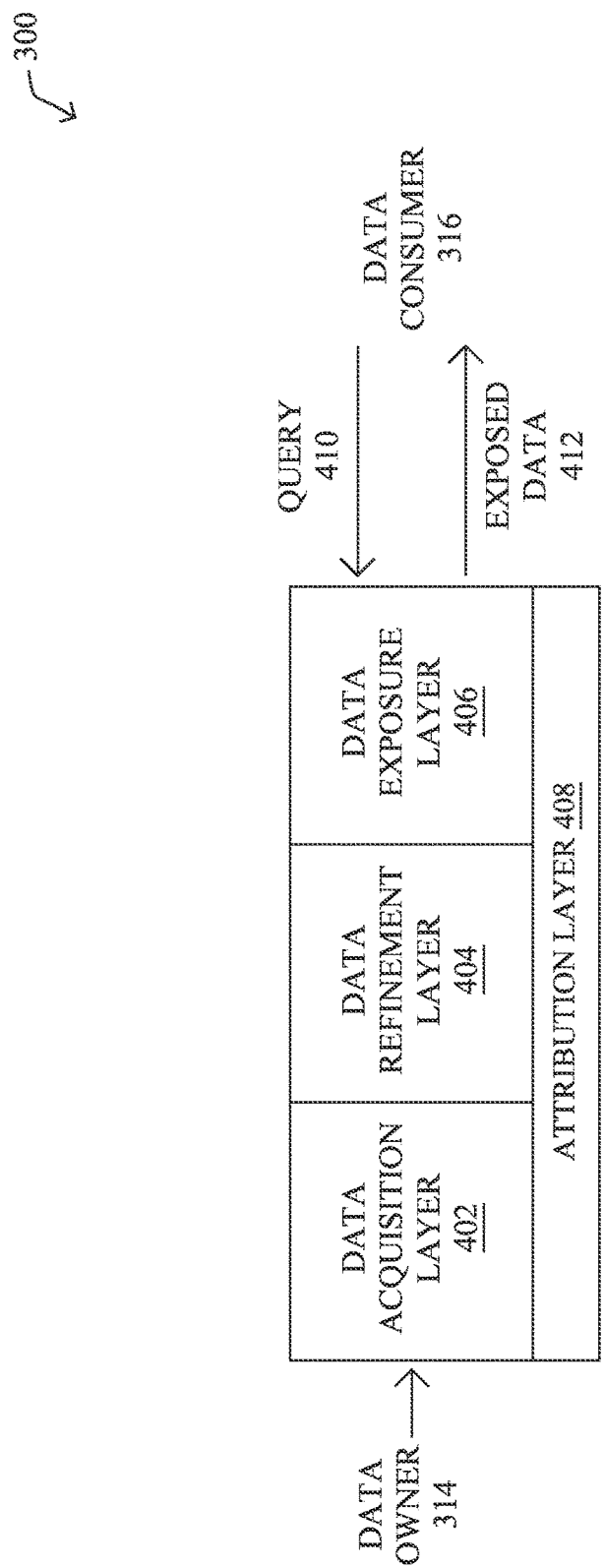
FIG. 4 illustrates an example of the various layers of operation of the data sharing platform of FIG. 3.

FIG. 4 illustrates an example of the various layers of operation of the data sharing platform of FIG. 3, according to various embodiments. As shown in FIG. 4, data sharing platform 300 may include various processing layers, such as data acquisition layer 402, data refinement layer 404, and data exposure layer 406. Notably, data acquisition layer 402 may be responsible for ingesting data associated with data owner 314. In turn, this data may be processed by data refinement layer 404, where it may be transformed, enriched, and/or undergo other data operations. Finally, the resulting data may be exposed by data exposure layer 406 to various data consumers, such as data consumer 316. For instance, data consumer 316 may issue a query 410 to data exposure layer 406 for a certain type of data and, in response, receive exposed data 412.

According to various embodiments, the techniques herein also propose that data sharing platform 300 include an attribution layer 408. In general, attribution layer 408 may overlap the various other layers 402-406 of data sharing platform 300 and is responsible for associating the various datasets maintained by each of these layers with attribution tags that associate data in a given dataset back to data owner 314. Thus, as layers 402-406 perform various data operations using the data associated with data owner 314, attribution layer 408 may track its use throughout data sharing platform 300, even after the data is refined or otherwise transformed.

Figure 5:
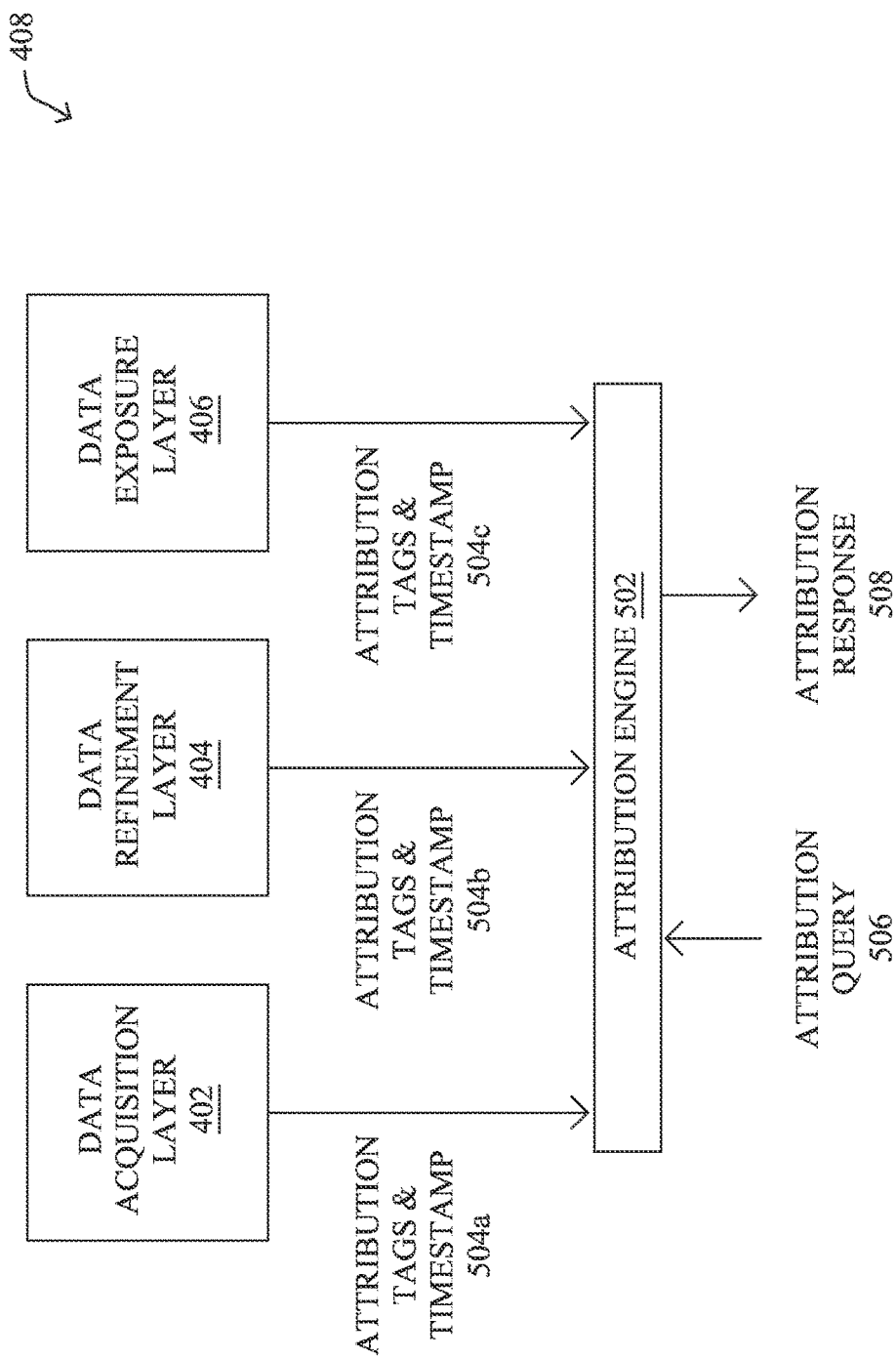
FIG. 5 illustrates an example architecture for a data attribution layer for a data sharing platform.

FIG. 5 illustrates an example architecture for a data attribution layer 408 for a data sharing platform, according to various embodiments. As shown, data attribution layer 408 may include an attribution engine 502 that is responsible for tracking the attribution chain for the data associated with a particular data owner across the data operations of layers 402-406. More specifically, attribution engine 502 may assign attribution tags 504 that identify the owner of the data undergoing a data operation. For instance, in one embodiment, attribution tags 504 may take the form of anonymized tokens that are associated with the data owner. In addition, attribution tags 504 may also include additional information, such as an identification of the data operation, a timestamp, or the like.

For instance, as data acquisition layer 402 ingests data from a particular data owner, attribution engine 502 may assign attribution tags 504a to that data, such as when the data is stored in user data vault 302, master database 304, etc. In other words, attribution engine 502 may track the attribution back to the data owner as their data moves through these different data operations and datasets.

Similarly, attribution engine 502 may assign attribution tags 504b as the data associated with the data owner moves through data refinement layer 404. For instance, data refinement layer 404 may compute any number of datasets by applying different data transformations to the data associated with the user (e.g., by computing an aggregated metric, a statistic, etc.). In such a case, attribution tags 504b may be associated with the transformed dataset. Thus, even though the transformed data may differ from what was originally shared by the data owner, attribution engine 502 is able to track the attribution back to the data owner.

Finally, attribution engine 502 may also assign attribution tags 504c to the data processed by data exposure layer 406. Thus, the various attribution tags 504c may indicate when the data attributable back to the data owner was provided by the various use case sharing services 310 of data sharing platform 300. For instance, in the case of the exposed data to a data consumer taking the form of an average thermostat setting used in a particular zip code, attribution tags 504c may indicate when that average value was provided to different data consumers. In addition, attribution tags 504c may also attribute such an operation back to the various data owners on whose data the exposed data was computed.

In further embodiments, another function of attribution engine 502 is to determine the attribution chain that links the data shared by the particular data owner to the different types of data provided via the different sharing services. For instance, as shown, attribution engine 502 may receive an attribution query 506 for a particular data owner. In response, attribution engine 502 may return attribution response 508 that is indicative of the attribution chain for display. In further aspects, attribution engine 502 may allow an attribution chain to be queried by time, data owner, dataset, combinations thereof, or the like.

As a result of the query functions of attribution engine 502, data sharing platform 300 may be configured to answer questions such as:

What is happening to my data?—Here, data sharing platform 300 may allow a data owner to view a dashboard that displays an indication of the computed attribution chain for their data, to review how their data is actually being used by data sharing platform 300. Such information may, for instance, indicate the types of data exposed by use case sharing services 310 that are based on the data owned by the data owner, as well as other information.

How much credit have I earned?—In addition to showing a data owner how their data is being used, data sharing platform 300 may also leverage attribution response 508 to indicate an amount of credit that a data owner has earned by sharing their data. For instance, this credit could be used by those data owners to access certain online services (e.g., an email service, a file storage service, an online game, etc.) in exchange for use of their data, an amount of compensation, or the like.

What is the relative value of a certain type of data?—Here, data sharing platform 300 may also leverage the query mechanism of attribution engine 502 to assess the importance metrics associated with the data available from data sharing platform 300. For instance, say a potential data consumer wishes to review the relative value of data associated with sports fans located in Idaho. In such a case, attribution response 508 may be used to attribute that desired data back to its underlying data owners and compute an appropriate amount of credit for those users that would be needed in order for the potential data consumer to access their desired data.

Note that the operations of attribution engine 502 may also be performed in (near-) real-time, as data sharing platform 300 operates. As a result, data sharing platform 300 is able to precisely track how the data associated with a particular data owner is used over the course of time. Even if the data owner opts out of sharing a certain type of data, the attribution tags 504 generated by attribution engine 502 can be used to precisely determine when their data was used and was not, so that the data owner can be credited, accordingly.

Figure 6:
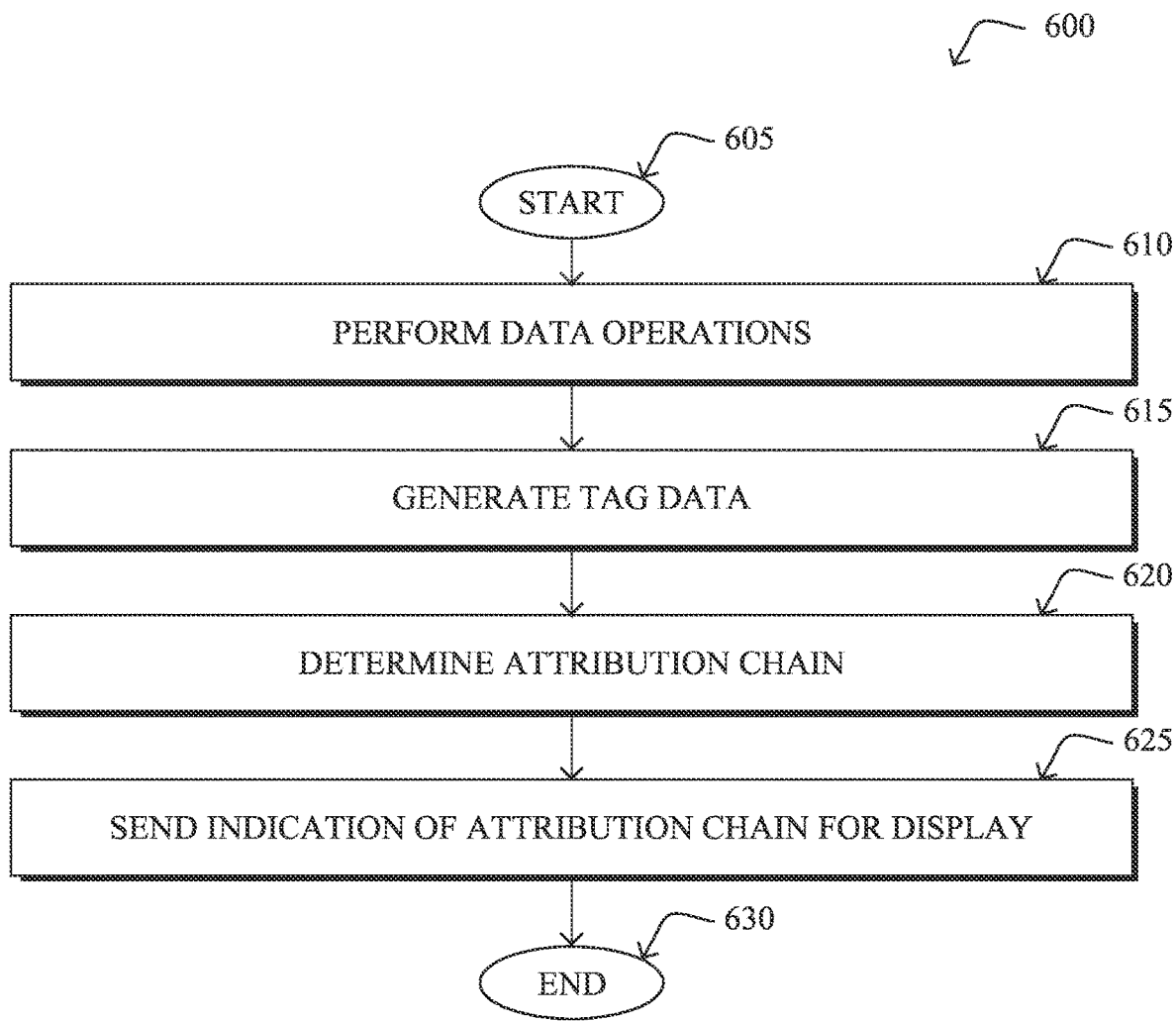
FIG. 6 illustrates an example simplified procedure for determining an importance metric for data used in a data sharing platform.

FIG. 6 illustrates an example simplified procedure (e.g., a method) for determining an importance metric for data used in a data sharing platform, in accordance with one or more embodiments described herein. For example, a non-generic, specifically configured device (e.g., device 200), may perform procedure 600 by executing stored instructions (e.g., data sharing process 248), to provide a data sharing platform. The procedure 600 may start at step 605, and continues to step 610, where, as described in greater detail above, the data sharing platform may perform a series of data operations to provide different types of data via different sharing services of the data sharing platform that are derived from data shared by a particular data owner. In some embodiments, at least one of the data operations includes a transformation of the data shared by the data owner into transformed data. For instance, the data sharing platform may transform the data shared by the data owner into another form of data that is then shared by one of the sharing services of the platform.

At step 615, as detailed above, the data sharing platform may generate tag data associated with the particular data owner for one or more of the series of data operations. In various embodiments, the generated tag data may serve aa a record that the data associated with the particular data owner was used in a data operation. To this end, the tag data may also include a timestamp indicative of when the data operation was performed. In another embodiment, the tag data may comprise an anonymized token associated with the particular data owner. By way of example, assume that the data operation transforms the data shared by the particular data owner into some form of transformed data. By applying a tag to the transformed data, the data sharing platform can attribute the transformed data back to the data owner.

At step 620, the data sharing platform may determine, based on the tag data, an attribution chain that links the data shared by the particular data owner to the different types of data provided via the different sharing services, as described in greater detail above. In some embodiments, the data sharing platform may do so in response to receiving a request for the attribution chain for the particular data owner.

At step 625, as detailed above, the data sharing platform may send an indication of the attribution chain for display.

In one embodiment, the data sharing platform may send the indication for display to the particular data owner. This allows the data owner to review how their data is being used by the data sharing platform. In another embodiment, the data sharing platform may send the indication for display to a potential user of a sharing service. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the attribution of user data sources across datasets in a data sharing platform, it is to be understood that various other adaptations and modifications may be made within the spirit and scope of the embodiments herein. For example, while certain embodiments are described herein with respect to sharing data for certain use cases, the techniques herein are not limited as such and the techniques herein can be used to share any number of different types of data, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    performing, by a data sharing platform comprising a plurality of data processing layers for different sharing services and an attribution layer that overlaps the plurality of data processing layers and associates data shared by data owners, a series of data operations to provide different types of data via the different sharing services of the data sharing platform that are derived from data shared by a particular data owner;
    generating, by the data sharing platform and by using the attribution layer, tag data associated with the particular data owner for one or more of the series of data operations;
    determining, by the data sharing platform and based on the tag data, an attribution chain that links the data shared by the particular data owner to the different types of data provided via the different sharing services; and
    sending, by the data sharing platform, an indication of the attribution chain for display.

2. The method as in claim 1, wherein the tag data comprises an anonymized token associated with the particular data owner.

3. The method as in claim 1, wherein the tag data comprises timestamp information for the data operations.

4. The method as in claim 1, wherein the data sharing platform provides the indication of the attribution chain for display, in response to receiving a request for the attribution chain for the particular data owner.

5. The method as in claim 1, wherein at least one of the data operations includes a transformation of the data shared by the particular data owner into transformed data.

6. The method as in claim 5, further comprising:
associating the tag data with the transformed data.

7. The method as in claim 5, wherein the different types of data provided by the data sharing platform via different sharing services of the data sharing platform comprise the transformed data.

8. The method as in claim 1, wherein the indication of the attribution chain is sent for display to the particular data owner.

9. The method as in claim 1, further comprising:
computing, based on the attribution chain, an importance metric for the data shared by the particular data owner, wherein the importance metric is indicative of: a popularity of the different sharing services that rely on the data shared by the particular data owner, how much contribution the data shared by the particular data owner contributed to final data shared by the different sharing services, or how unique the data shared by the particular data owner is.

10. The method as in claim 1, wherein the indication of the attribution chain is sent for display to a potential user of a sharing service.

11. An apparatus, comprising:
one or more network interfaces;
a processor coupled to the one or more network interfaces and configured to execute one or more processes; and
a memory configured to store a process that is executable by the processor, the process when executed configured to:
perform a series of data operations, as part of a data sharing platform comprising a plurality of data processing layers for different sharing services and an attribution layer that overlaps the plurality of data processing layers and associates data shared by data owners, to provide different types of data via the different sharing services of the data sharing platform that are derived from data shared by a particular data owner;
generate, by using the attribution layer, tag data associated with the particular data owner for one or more of the series of data operations;
determine, based on the tag data, an attribution chain that links the data shared by the particular data owner to the different types of data provided via the different sharing services; and
send an indication of the attribution chain for display.

12. The apparatus as in claim 11, wherein the tag data comprises an anonymized token associated with the particular data owner.

13. The apparatus as in claim 11, wherein the tag data comprises timestamp information for the data operations.

14. The apparatus as in claim 11, wherein the data sharing platform provides the indication of the attribution chain for display, in response to receiving a request for the attribution chain for the particular data owner.

15. The apparatus as in claim 11, wherein at least one of the data operations includes a transformation of the data shared by the particular data owner into transformed data.

16. The apparatus as in claim 15, further comprising:
associating the tag data with the transformed data.

17. The apparatus as in claim 15, wherein the different types of data provided by the data sharing platform via different sharing services of the data sharing platform comprise the transformed data.

18. The apparatus as in claim 11, wherein the indication of the attribution chain is sent for display to the particular data owner.

19. The apparatus as in claim 11, wherein the process when executed is further configured to:
compute, based on the attribution chain, an importance metric for data shared by a particular data owner, wherein the importance metric is indicative of: a popularity of the different sharing services that rely on the data shared by the particular data owner, how much contribution the data shared by the particular data owner contributed to final data shared by the different sharing services, or how unique the data shared by the particular data owner is.

20. A tangible, non-transitory, computer-readable medium storing program instructions that cause a data sharing platform to execute a process comprising:
performing, by the data sharing platform comprising a plurality of data processing layers for different sharing services and an attribution layer that overlaps the plurality of data processing layers and associates data shared by data owners, a series of data operations to provide different types of data via the different sharing services of the data sharing platform that are derived from data shared by a particular data owner;
generating, by the data sharing platform and by using the attribution layer, tag data associated with the particular data owner for one or more of the series of data operations;
determining, by the data sharing platform and based on the tag data, an attribution chain that links the data shared by the particular data owner to the different types of data provided via the different sharing services; and
sending, by the data sharing platform, an indication of the attribution chain for display.

* * * * *